(12) United States Patent
Burka et al.

(10) Patent No.: US 8,875,115 B2
(45) Date of Patent: Oct. 28, 2014

(54) TYPE MERGING TECHNIQUE TO REDUCE CLASS LOADING DURING JAVA VERIFICATION

(75) Inventors: Peter Wiebe Burka, Ottawa (CA); Thomas Mark Walter Bottomley, Orleans (CA)

(73) Assignee: International Business Machines Corporation, Armonk, NY (US)

( * ) Notice: Subject to any disclaimer, the term of this patent is extended or adjusted under 35 U.S.C. 154(b) by 1515 days.

(21) Appl. No.: 12/325,147

(22) Filed: Nov. 29, 2008

(65) Prior Publication Data

US 2010/0138819 A1 Jun. 3, 2010

(51) Int. Cl.
G06F 9/45 (2006.01)

(52) U.S. Cl.
CPC .................................... G06F 8/4434 (2013.01)
USPC ............................ 717/154; 717/151; 717/159

(58) Field of Classification Search
None
See application file for complete search history.

(56) References Cited

U.S. PATENT DOCUMENTS

| | | | | |
|---|---|---|---|---|
| 5,740,441 A | * | 4/1998 | Yellin et al. | 717/134 |
| 5,966,702 A | * | 10/1999 | Fresko et al. | 707/999.01 |
| 6,142,184 A | * | 11/2000 | Yen | 137/801 |
| 6,182,284 B1 | * | 1/2001 | Sreedhar et al. | 717/159 |
| 6,192,517 B1 | * | 2/2001 | Agesen et al. | 717/154 |
| 6,442,751 B1 | * | 8/2002 | Cocchi et al. | 717/154 |
| 6,546,551 B1 | * | 4/2003 | Sweeney et al. | 717/154 |
| 6,557,168 B1 | * | 4/2003 | Czajkowski | 717/151 |
| 6,567,974 B1 | * | 5/2003 | Czajkowski | 717/151 |
| 6,772,410 B1 | * | 8/2004 | Komatsu et al. | 717/124 |
| 6,898,787 B2 | * | 5/2005 | Thompson et al. | 717/159 |
| 6,901,586 B1 | * | 5/2005 | Czajkowski | 717/151 |
| 6,938,247 B2 | * | 8/2005 | Czajkowski | 717/151 |
| 7,080,363 B2 | * | 7/2006 | Yellin et al. | 717/139 |
| 7,082,600 B1 | * | 7/2006 | Rau et al. | 717/159 |
| 7,171,655 B2 | * | 1/2007 | Gordon et al. | 717/146 |
| 7,197,511 B2 | * | 3/2007 | Bracha et al. | 717/166 |
| 7,213,243 B2 | * | 5/2007 | Kira | 717/159 |
| 7,287,243 B2 | * | 10/2007 | Dollin et al. | 717/126 |
| 7,343,598 B2 | * | 3/2008 | Chilimbi et al. | 717/158 |
| 7,444,648 B2 | * | 10/2008 | Bracha et al. | 719/332 |
| 7,587,721 B2 | * | 9/2009 | Schmidt et al. | 717/116 |
| 7,603,662 B2 | * | 10/2009 | Rajaram et al. | 717/154 |

(Continued)

OTHER PUBLICATIONS

Qian, et al., "A Formal Specificaiton of Java Class Loading", 2000 ACM; [retrieved on Mar. 16, 2012]; Retrieved from Internet <URL:http://dl.acm.org/citation.cfm?id=353193>; pp. 325-336.*

(Continued)

*Primary Examiner* — Tuan Q. Dam
*Assistant Examiner* — Xi D Chen
(74) *Attorney, Agent, or Firm* — Nelson and Nelson; Daniel P. Nelson; Alexis V. Nelson

(57) ABSTRACT

An apparatus, process, and computer program product to merge types in an object-oriented program is disclosed herein. In one embodiment, a process may include analyzing a method within an object-oriented program to identify merge candidates. These merge candidates may then be recorded in a merge candidate list. The process may further include identifying at least two code paths in the method that merge into a single code path and that operate on different types. The types in these code paths may then be merged to a nearest common superclass listed in the merge candidate list. In selected embodiments, the types may be merged to the java.lang.Object class in the event the merge candidate list is empty.

24 Claims, 6 Drawing Sheets

(56) References Cited

U.S. PATENT DOCUMENTS

| | | | |
|---|---|---|---|
| 7,661,092 B1* | 2/2010 | Bottomley et al. | 717/118 |
| 7,669,193 B1* | 2/2010 | Chipman | 717/152 |
| 7,949,848 B2* | 5/2011 | Wilkinson | 711/171 |
| 8,060,812 B2* | 11/2011 | Branda et al. | 714/807 |
| 8,122,442 B2* | 2/2012 | Lin | 717/159 |
| 8,141,064 B2* | 3/2012 | Chipman | 717/154 |
| 8,161,464 B2* | 4/2012 | Archambault et al. | 717/151 |
| 8,752,015 B2* | 6/2014 | Basak et al. | 717/154 |
| 2003/0145310 A1* | 7/2003 | Thames et al. | 717/123 |
| 2005/0066283 A1* | 3/2005 | Kanamaru | 715/749 |
| 2009/0064114 A1* | 3/2009 | Bottomley et al. | 717/148 |
| 2010/0058299 A1* | 3/2010 | Greene | 717/131 |

OTHER PUBLICATIONS

Coglio, Goldberg, "Type Safety in the JVM: Some Problems in JDK 1.2.2 and Proposed Solutions", 2000 The proceedings of the second workshop on "Formal Techniques for Java Programs"; [retrieved on Mar. 15, 2012]; Retrieved from Internet <URL:http://osftech.informatik.uni-kl.de/twiki/pub/Homepage/Publicationen/ftfjp00.pdf#page=47>; pp. 1-6.*

Gagnon, et al., "Efficient Inference of Static Types for Java Bytecode", 2000 Springer-Verlag Berlin Heideberg; [retrieved on Mar. 14, 2012]; Retrieved from Internet <URL:http://www.springerlink.com/content/h63wqqv9jxvb4tcx/fulltext.pdf>; pp. 199-220.*

Klein, Nipkow, "Verified lightweight bytecode verification", 2001 John Wiley & Sons, Ltd.; [retrieved on Mar. 15, 2012]; Retrieved from Internet <URL:http://onlinelibrary.wiley.com/doi/10.1002/cpe.597/pdf>; pp. 1133-1151.*

Leroy, "Bytecode verificaiton on Java smart cards", 2002, Software—Practice and Experience; [retrieved on Mar. 15, 2012]; Retrieved from Internet <URL:http://onlinelibrary.wiley.com/doi/10.1002/spe.438/pdf>; pp. 319-340.*

Leroy, "Java Bytecode verification: Algorithms and Formalizations", 2003, Journal of Automated Reasoning; [retrieved on Mar. 14, 2012]; Retrieved from Internet <URL:http://www.springerlink.com/content/q9rl07302427686j/fulltext.pdf>; pp. 235-269.*

Toxawa, Hagiya, "Formalization and Analysis of Class Loading in Java", 2002, Higher-Order and Symbolic Computation; [retrieved on Mar. 16, 2012]; Retrieved from Internet <URL:http://www.springerlink.com/content/t7j33388u1150347/fulltext.pdf>; pp. 7-55.*

Stark, et al., "Java and the Java Virtual Machine Definition, Verification, Validation", 2001, Springer-Verlag; [retrieved on Mar. 16, 2012]; Retrieved from Internet <URL:http://extras.springer.com/2001/978-3-540-42088-0/jbook/pdf>; pp. 1-381.*

Suganuma, et al., "A Reginon-Based Compilation Technique for Dynamic Compilers"; 2006 ACM; [retrieved on Jun. 13, 2014]; Retrieved from Internet <URL:http://dl.acm.org/citation.cfm?id=1111596>;pp. 134-174.*

Suganuma, et al., "A Region-Based Compilation Technique for a Java Just-In-Time Compiler"; 2003 ACM; [retrieved on Jun. 13, 2014]; Retrieved from Internet <URL:http://dl.acm.org/citation.cfm?id=781131>;pp. 312-323.*

Zhang, et al., "An Inter-Classes Obfuscation Method for Java Program"; 2008 IEEE; [retrieved on Jun. 13, 2014]; Retrieved from Internet <URL:http://ieeexplore.ieee.org/stamp/stamp.jsp?tp=&arnumber=4511592>;pp. 360-365.*

Foket, et al., "Pushing Java Type Obfuscation to the Limit"; 2013 IEEE; [retrieved on Jun. 13, 2014]; Retrieved from Internet <URL:http://ieeexplore.ieee.org/stamp/stamp.jsp?tp=&arnumber=6739076>;pp. 1-14.*

Goldberg, Allen, A Specification of Java Loading and Bytecode Verification, Conference on Computer and Communications Security Archive, Proceedings of the 5th ACM Conference on Computer and Communications, San Francisco, California, USA, pp. 49-58, 1998.

"The Java Virtual Machine Second Edition", section 4.8: "Constraints on Java Virtual Machine Code" and section 4.9: "Verification of class Files", as found at http://java.sun.com/docs/books/jvms/second_edition/html/ClassFile.doc.html.

* cited by examiner

100

```
Code Sample 1 class A;
class B extends A;
class C extends A;

class Foo {
        public static void main (string[]args) {
                Object o;
                if (args.length > 0) {
                        o = new B();
                } else {
                        o = new C();
                }
                o.toString();
        }
}
```

Merge Candidate List

```
Code Sample 2 class A;
class B extends A;
class C extends A;

class Foo {
    public static void main (string[]args) {
        Object o;
        if (args.length > 0) {
            o = new B();
        } else {
            o = new C();
        }
        o.methodofA();
    }
}
```

210

```
Merge Candidate List
          A
```

300

Code Sample 3

```
interface I;
class B implements I;
class C implements I;

class Foo {
        public static void main (string[]args) {
                I i;
                if (args.length > 0) {
                        i = new B();
                } else {
                        i = new C();
                }
                i.doSomething();
        }
}
```

Merge Candidate List

```
Code Sample 4 class B;
class C;

class Foo {
        public static void main (string[]args) {
                if (args.length > 0) {
                        B b = new B();
                        b.doSomething();
                } else {
                        Object c = new C();
                        c.toString();
                }
        }
}
```

| Merge Candidate List |
| --- |
| B |

Fig. 4B

TYPE MERGING TECHNIQUE TO REDUCE CLASS LOADING DURING JAVA VERIFICATION

BACKGROUND

1. Field of the Invention

This invention relates to apparatus and processes for verifying an object-oriented program, and more particularly to apparatus and processes for merging types when verifying Java or other object-oriented programs.

2. Background of the Invention

The Java virtual machine (JVM) is a Java interpreter and platform-independent execution environment. Java source code or other source code may be compiled into a format known as Java bytecode. This bytecode may then be executed on a JVM installed on a particular machine. Web browsers and other web-based software are often equipped with JVMs. The Java platform is designed to be inherently "safe," meaning that it is difficult for a program to crash the host machine or interfere inappropriately with other operations on the host machine. This allows certain functions and data structures belonging to "trusted" code to be protected from access or corruption by "untrusted" code executing within the JVM.

One way that the JVM provides safety is by providing "type safety." Type safety requires programs with type errors to produce error indications rather than execute the programs and produce erroneous results. Type safety is helpful to develop and debug program code, but more importantly prevents erroneous executions that can be exploited to introduce security flaws. Because JVM bytecode may be transmitted over the Internet and executed remotely, the JVM needs to determine whether class files were produced by a trustworthy compiler or by an adversary attempting to exploit the virtual machine.

Accordingly, the Java specification requires that Java classes loaded by the JVM are verified prior to being executed. Verification is a compiler independent process that verifies that a class satisfies various structural and static constraints. For example, the JVM verifier may keep track of the types operated on by the bytecode. For example, if the bytecode is invoking string behavior (indicates that it is operating on a string), the JVM verifier may verify that the object being operated on is actually a string. If the program code is not operating on the type that is indicated in the code, the program may generate undefined behavior (e.g., crashes), unpredictable behavior, or allow untrusted programs to compromise security.

One task that the JVM verifier performs when verifying types is "type merging." Type merging is performed where two or more different code paths, each operating on a different type, merge together into a single code path. The JVM verifier may merge the types operated on by the different code paths into the least common superclass for each type. In many cases, a valid merge may require loading each class along with its full hierarchy. In fact, where the classes are different and neither class is the java.lang.Object class, the merge may result in loading the complete hierarchy for both classes.

In some cases, the merge will provide no value because the types may merge to the most generic Java class (i.e., the java.lang.Object class). In other cases, a merge may unnecessarily consume resources because the merged type may not be needed later in the method (i.e., a subroutine of a class or object). In either case, the merge may result in excess and unnecessary class loading which may have a negative impact on application startup time and memory usage.

In view of the foregoing, what is needed is an apparatus and process to optimize performance and resource utilization when merging types. Ideally, such an apparatus and process would reduce or minimize the number of classes that are loaded when merging types.

SUMMARY

The invention has been developed in response to the present state of the art and, in particular, in response to the problems and needs in the art that have not yet been fully solved by currently available apparatus and processes. Accordingly, the invention has been developed to provide improved apparatus and processes for merging types when verifying Java or other object-oriented program code. The features and advantages of the invention will become more fully apparent from the following description and appended claims, or may be learned by practice of the invention as set forth hereinafter.

Consistent with the foregoing, a process for merging types in a method (i.e., a sub-routine of a class or object) of an object-oriented program is disclosed herein. In one embodiment, such a process may include analyzing a method within an object-oriented program to identify merge candidates. Merge candidates may be defined generally to include classes that are used as input parameters to operations within the method. These merge candidates may then be recorded in a merge candidate list. The process may further include identifying at least two code paths in the method that merge into a single code path and that operate on different types. The types in these code paths may then be merged to a nearest common superclass listed in the merge candidate list (as opposed to just the nearest common superclass). In selected embodiments, the types may be merged to the java.lang.Object class in the event the merge candidate list is empty.

A corresponding apparatus and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 1A is a first code sample illustrating an improved process for merging types;

FIG. 1B is a merge candidate list associated with the code sample of FIG. 1A;

FIG. 3A is a third code sample showing an improved process for merging types;

FIG. 3B is a merge candidate list associated with the code sample of FIG. 3A;

FIG. 4A is a fourth code sample showing an improved process for merging types;

FIG. 4B is a merge candidate list associated with the code sample of FIG. 4A;

DETAILED DESCRIPTION

Figure 2A:
FIG. 2A is a second code sample showing an improved process for merging types.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, process, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "module," "system," or "apparatus." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of processes, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1A, a first code sample 100 illustrating an improved process for merging types is illustrated. As mentioned above, conventional Java verification techniques often require that classes, merging into a single code path, be merged to their nearest common ancestor. However, the instant inventors have discovered that this is not always necessary. In general, the instant inventors have discovered that it is actually preferable to merge classes to the nearest common ancestor which is referenced elsewhere in the method being verified, as will be explained in more detail hereafter. This will often reduce the number of potential merge candidates and thereby reduce the number of classes that need to be loaded.

By reducing the number of potential merge candidates, it is possible to prove that a merge to anything other than the java.lang.Object class is impossible. The java.lang.Object class is the ultimate superclass for all objects and every class in the system has the java.lang.Object class as its ultimate parent. The java.lang.Object class is the root of the class hierarchy and every variable and method defined in the java.lang.Object class is available in every other class. Thus, all classes can trivially merge to the java.lang.Object class and classes can always be merged to the java.lang.Object class without loading additional classes.

Consider the first code sample 100 illustrated in FIG. 1A. This code sample 100 defines a class "A" and classes "B" and "C" which are both subclasses of "A". All of the classes are implicitly subclasses of the java.lang.Object class. In this example, the code sample 100 declares an object "o" (an empty slot) and contains an if-else statement that provides two different paths through the code sample 100. On a first code path (the "if" path), the code sample generates and stores an object of type "B" into the "o" slot. On a second code path (the "else" path), the code sample generates and stores an object of type "C" into the "o" slot. The value of the "args.length" argument determines whether the code follows the "if" or the "else" path. Once the two code paths merge into a single code path (upon exiting the if-else clause), the slot "o" will store either an object of type "B" or "C". The code sample 100 then calls an object method (i.e., the "o.toString( )" method which converts the object into a textual representation) of the object that is stored in "o". When the Java verifier examines the code sample 100 (i.e., the method 100), the verifier will discover that "o" can store either an object of type "B" or "C". At this point, a conventional Java verifier would have to load both "B" and "C" to determine which superclass it can merge them to, and then follow the class hierarchy to discover that the nearest common ancestor is class "A". The conventional verifier would then merge "B" and "C" to class "A".

Unfortunately, the previous step is unnecessary. That is, if the verifier was intelligent enough, the verifier could merge "B" and "C" to the java.lang.Object class, instead of to "A", since class "A" is not actually used in the illustrated method 100. That is, "o.toString( )" is a method that is associated with the java.lang.Object superclass, as opposed to class "A". Thus, in this code sample 100, it doesn't matter that "B" and "C" are both subclasses of "A". The most important thing to know is that "B" and "C" are both subclasses of the java.lang.Object class. The verifier can infer this without even examining "B" and "C", since every object is a subclass of the java.lang.Object class. Furthermore, the verifier may perform this merge without loading "B" and "C", saving both time and resources. Thus, it is advantageous to merge classes to the nearest common ancestor which is referenced elsewhere in the method being verified, as opposed to just the nearest common ancestor (as performed in the conventional manner).

In order to implement this improvement, a merge candidate list 110 may be established when verifying a method or other section of program code. This merge candidate list 110 may store a list of "merge candidates," which will be defined and explained hereafter. The merge candidates may be identified by a simple linear scan of the program code 100 during verification, although non-linear scans are also possible. As the merge candidates are identified, they may be recorded in the merge candidate 110.

Merge candidates may be generally defined to include classes that are used as input parameters to operations within a method 100 or section of program code 100. For example, merge candidates may include the following:

1) The target (receiver) of an invokevirtual bytecode. For example, the class "Dog" would be recorded in the merge candidate list where the message "dog.feed( )" is in the method being verified, and "dog" is an instance of the class "Dog".
2) The target (receiver) of an invokespecial bytecode where the method is not <init>.
3) The non-primitive arguments (parameters) to any invoke family bytecode. For example, the classes "FoodType" and "CareTaker" would be recorded in the merge candidate list where the message "dog.feed(FoodType chow, CareTaker owner)" is in the method being verified.
4) The target (receiver) of a getfield or putfield bytecode. For example, the class "Dog" would be recorded in the merge candidate list where the statement "dog.owner=me" is in the method being verified, and "dog" is an instance of the class "Dog".
5) The non-primitive arguments (parameters) to any putstatic or putfield bytecode. For example, the class "CareTaker" would be added to the merge candidate list where the statement "dog.owner=me" is in the method being verified, and "me" is an instance of the class "CareTaker".
6) The non-primitive return type of a method. For example, the class "CareTaker" would be added to the merge candidate list where the method "dog.getCareTaker( )" returns an instance of the class "CareTaker".

In certain embodiments, certain classes may be omitted from the merge candidate list 110. For example, one or more of the following may be omitted from the merge candidate list 110:

7) The java.lang.Object class (because it merges trivially with all classes).
8) Any class once identified as an interface (because it merges trivially with all classes as compatibility is checked at run time).
9) Any class once identified as "final" (because it can only participate in trivial merges with itself).

Once merge candidates are identified and recorded in the merge candidate list 110, the only possible merge results will be recorded in the merge candidate list 110. Accordingly, merging is not performed using conventional verification techniques which merge objects to the nearest common superclass, but rather to the nearest common superclass that exists in the merge candidate list. One of the primary advantages of this technique is that the merge candidate list 110 will often be empty (in this case, all classes may be trivially merged to the java.lang.Object class), resulting in fewer class loads at verification time.

For example, referring to FIG. 1B, the merge candidate list 110 for the code sample 100 is empty because no merge candidates (other than the java.lang.Object class) exist. Consequently, the verifier can merge classes "B" and "C" to the java.lang.Object class without needing to load either class.

Figure 2B:
FIG. 2B is a merge candidate list associated with the code sample of FIG. 2A.

Referring to FIGS. 2A and 2B, a second code sample 200 illustrating an improved process for merging types is illustrated. In this example, the code sample 200 establishes a class "A", while also establishing classes "B" and "C" which are both subclasses of "A". Like the code segment 100 illustrated in FIG. 1A, the code sample 200 declares an object "o" (an empty slot) and includes an if-else statement that provides two different paths through the code sample 200.

Once the two code paths merge into a single code path, the slot "o" will store either a "B" or "C" object. Instead of calling the method "o.toString( )" like the code sample 100 of FIG. 1A, the code sample 200 calls a method "o.methodofA( )" which is defined herein to be a method of class "A". In this case, the verifier will add the class "A" to the merge candidate list 210 illustrated in FIG. 2B. When merging types, the verifier will merge "B" and "C" to class "A" since it is in the merge candidate list. In such a case, the verifier may be required to load both "B" and "C" to determine which superclass to merge them to, and then follow the class hierarchy to discover that their nearest common ancestor that is in the merge candidate list 210 is class "A".

Referring to FIGS. 3A and 3B, a third code sample 300 illustrating another scenario is illustrated. In this example, the code sample 300 defines an interface "I" and defines "B" and "C" as classes that implement the interface "I". The code sample 300 declares an interface "i" of type "I" (an empty slot) and, like the previous example, includes an if-else statement that provides two different paths through the code sample 300. A first code path (the "if" path) generates and stores an object of type "B" in the "i" slot. A second code path (the "else" path) generates and stores an object of type "C" in the "i" slot. Thus, the "i" slot will store an object of either type "B" or "C".

Once the two code paths merge into a single code path, the program code 300 calls the method "i.doSomething( )", which is defined herein to be an interface method of "I". Because the method is an interface method, the interface "I" does not get added to the merge candidate list 310 (in accordance with rule 8 above). Because the merge candidate list 310 is empty, the verifier can merge classes "B" and "C" to the java.lang.Object class without needing to load either class.

Referring to FIGS. 4A and 4B, a fourth code sample 400 illustrating another scenario is illustrated. In this example, the code sample 400 defines classes "B" and "C", which are unrelated. The code sample 400 includes an if-else statement that provides two different paths through the code sample 400. A first code path (the "if" path) generates an object of type "B" and stores it in the "b" slot. The first code path then calls a method (i.e., "b.doSomething( )") of class "B". The second code path (the "else" path) generates an object of type "C" and stores it in the "c" slot. The second code path then calls a method (i.e., "c.toString( )") of the java.lang.Object class. In this example, only class "B" is added to the merge candidate list 410 since only a method of "B" is called (no method of "C" is called).

In this example, the verifier will attempt to merge "B" and "C" since the divergent codes paths merge into a single code path. Because "C" is not in the merge candidate list 410, the verifier will load "C" (because "B" is a merge candidate) and once the verifier determines that "C" is not a subclass of any class in the merge candidate list 410, the verifier will not have to load "B" and it can merge "B" and "C" directly to the java.lang.Object class. This process will be explained in more detail in association with FIG. 5.

Figure 5:
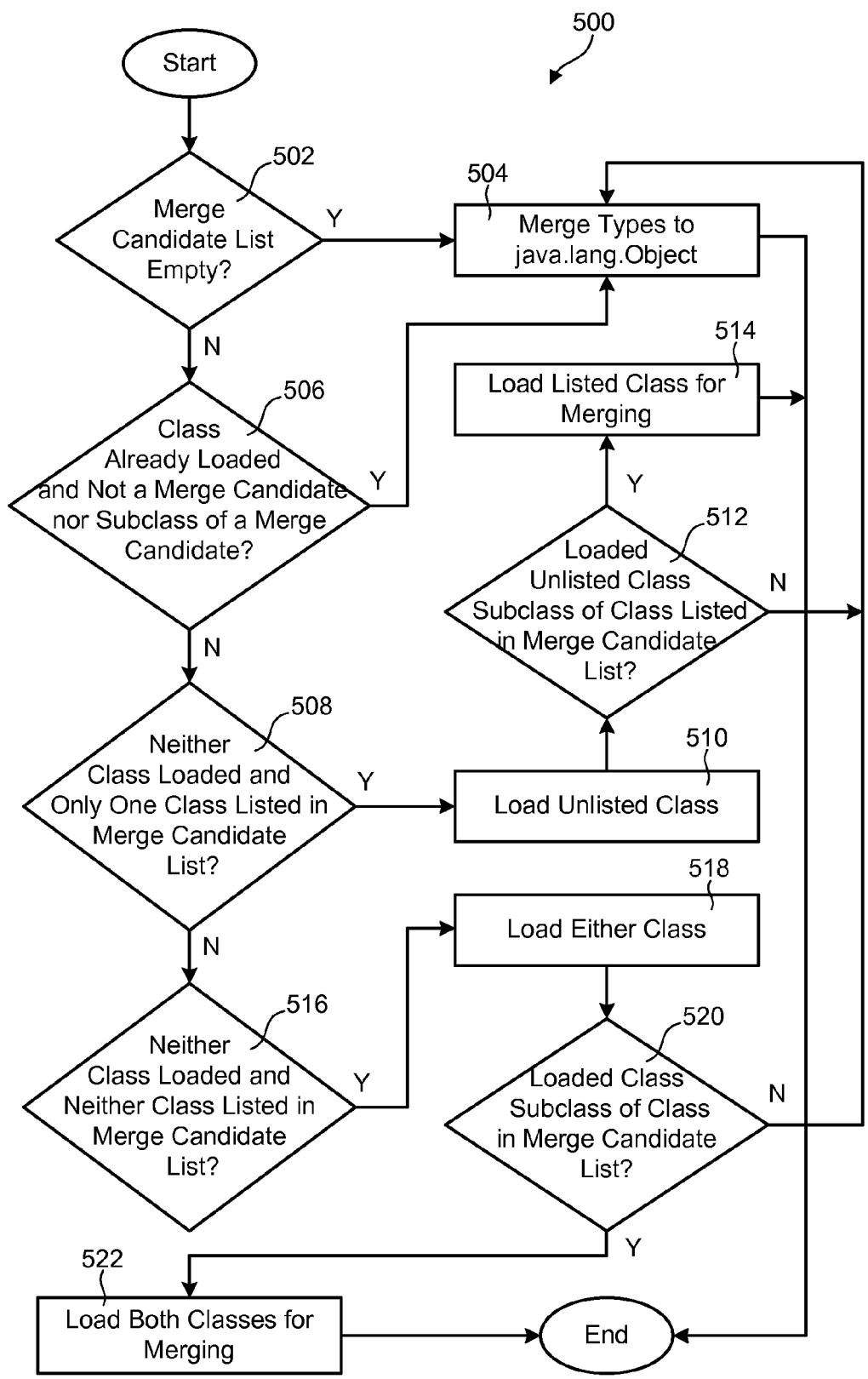
FIG. 5 is a flow chart showing one embodiment of a process for merging types.

Referring to FIG. 5, one embodiment of a process 500 (or a set of rules 500) for merging types is illustrated. After a method or a section of program code has been scanned, converging code paths have been identified, and the merge candidate list has been populated with merge candidates, the process 500 may initially determine 502 whether the merge candidate list is empty. If the merge candidate list is empty, the process 500 may merge 504 the types in the converging code paths to the java.lang.Object class.

If, on the other hand, the merge candidate list is not empty, the process 500 may determine 506 whether any class has already been loaded that is not a merge candidate nor a subclass of a merge candidate in the merge candidate list. If affirmative, the process 500 may merge 504 the types in the converging code paths to the java.lang.Object class. If negative, the process 500 may determine 508 whether neither class is loaded and only one class is listed in the merge candidate list. If affirmative, the process 500 may load 510 the unlisted class and determine 512 whether the unlisted class is a subclass of any class in the merge candidate list. If affirmative, the process 500 may load 514 the listed class for merging with the unlisted class. If negative, the process 500 may merge 504 the classes to the java.lang.Object class.

If, on the other hand, the outcome of decision step 508 is negative, the process 500 may determine 516 whether neither class has been loaded and neither class is listed in the merge candidate list. If affirmative, the process 500 may load 518 either class and determine 520 whether the loaded class is a subclass of a class in the merge candidate list. If affirmative, the process 500 may load 522 both classes for merging. If negative, the classes may be merged 504 to the java.lang.Object class.

Figure 6:
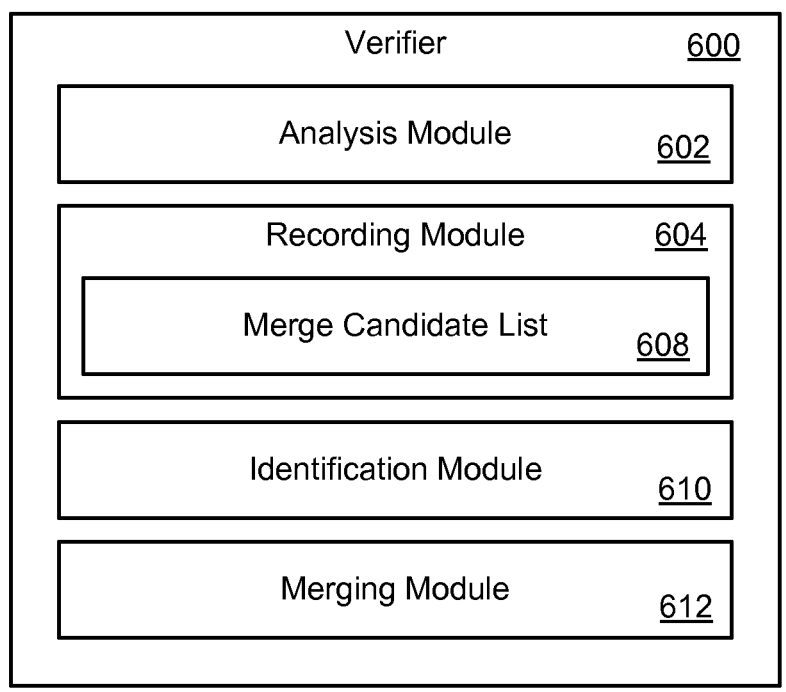
FIG. 6 is a high-level block diagram of one embodiment of an apparatus for merging types.

Referring to FIG. 6, in selected embodiments, a verifier 600 (i.e., an apparatus 600) in accordance with the invention may include one or more of the following: an analysis module 602, a recording module 604, an identification module 610, and a merging module 612.

The analysis module 602 may analyze a method (i.e., program code) to identify merge candidates. For example, the analysis module 602 may identify merge candidates using any of the rules 1-9 previously explained. Other rules may also be established or some rules may be omitted. In certain embodiments, the analysis module 602 may analyze the program code linearly, meaning that it analyzes the code bytecode-by-bytecode starting from the front of the code and progressing to the end of the code, or vice versa. In other embodiments, the analysis module 602 may analyze the code in a non-linear fashion. For example, the analysis module 602 may analyze the code in the same order it would be traversed during its execution.

A recording module 604 may record merge candidates in a merge candidate list 608 (examples of which are illustrated in FIGS. 1B, 2B, 3B, and 4B). The recording module 604 may record the names of the merge candidates in the list 608 or record other identifiers suitable for identifying the merge candidates. An identification module 610 may identify code paths that merge into a single code path, thereby indicating where types need to be merged. In certain embodiments, this may be accomplished by identifying conditional statements, expressions, or constructs which perform different computations or actions depending on whether a condition evaluates to "true" or "false." Such statements may include if-then-else statements, case and switch statements, pattern matching, branch predication, or the like. Where converging code paths are discovered, a merging module 612 may merge types to the nearest common superclass that exists in the merge candidate list 608. Where necessary, this may include loading classes during the merging process.

It should be noted that although particular reference is made herein to the Java programming environment, apparatus and processes in accordance with the invention are not necessarily limited to the Java programming environment. Thus, the Java programming environment is provided only by way of example. Indeed, the apparatus and processes disclosed herein may be applicable to other programming environments, regardless of whether they have the same names, rules, and/or syntax described herein, or to programming environments or situations where a similar problem exists.

The flowchart and block diagrams in the Figures illustrate the architecture, functionality, and operation of possible implementations of systems, processes, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A process for merging types of objects referenced in a method of an object-oriented program, the process comprising:
   performing the following during bytecode verification;
   analyzing, by a processor, a method within an object-oriented program to identify merge candidates, wherein merge candidates include classes that are used as input parameters to operations within the method;
   recording the merge candidates in a merge candidate list;
   identifying at least two code paths in the method that merge into a single code path, each code path operating on a different type of object;
   in the event the merge candidate list is not empty, loading at least one of the types of objects; and
   merging the types of objects to a nearest common superclass recorded in the merge candidate list.

2. The process of claim 1, wherein, in the event the merge candidate list is empty, merging the types of objects to the nearest common superclass includes merging the types of objects to the java.lang.Object class.

3. The process of claim 1, wherein analyzing the method includes scanning the method in a linear manner.

4. The process of claim 1, wherein analyzing the method includes scanning the method in a non-linear manner.

5. The process of claim 1, wherein the merge candidates are further defined to include classes satisfying at least one of the following: (1) the target of an invokevirtual bytecode; (2) the target of an invokespecial bytecode where the method is not <init>; (3) the non-primitive arguments to any invoke family bytecode; (4) the target of a getfield or putfield bytecode; (5) the non-primitive arguments to any putstatic or putfield bytecode; and (6) the non-primitive return type of a method.

6. The process of claim 1, wherein the merge candidates do not include at least one of the following: (1) the java.lang.Object class; (2) any class identified as an interface; and (3) any class identified as "final."

7. The process of claim 1, further comprising, in the event one type of object has already been loaded and the loaded type of object is not a merge candidate or a subclass of any merge candidate, merging the types of objects to the java.lang.Object class.

8. The process of claim 1, further comprising:
   in the event neither of the types of objects have been loaded and only one type of object is listed in the merge candidate list, loading the unlisted type of object; and
   in the event the loaded unlisted type of object is a subclass of a merge candidate in the merge candidate list, loading the listed type of object.

9. The process of claim 1, further comprising:
   in the event neither type of object has been loaded and neither type of object is listed in the merge candidate list, loading either type of object; and
   in the event the loaded type of object is a subclass of a merge candidate listed in the merge candidate list, loading the other type of object.

10. A computer program product for merging types of objects referenced in a method of an object-oriented program, the computer program product comprising:
    a non-transitory computer-readable storage medium having computer-usable program code embodied therein, the computer-usable program code configured to perform the following during bytecode verification:
    analyze a method within an object-oriented program to identify merge candidates, wherein merge candidates include classes that are used as input parameters to operations within the method;
    record the merge candidates in a merge candidate list;
    identify at least two code paths in the method that merge into a single code path, each code path operating on a different type of object;
    in the event the merge candidate list is not empty, load at least one of the types of objects; and
    merge the types of objects to a nearest common superclass listed in the merge candidate list.

11. The computer program product of claim 10, wherein the computer-usable program code is further configured to, in the event the merge candidate list is empty, merge the types of objects to the java.lang.Object class.

12. The computer program product of claim 10, wherein the computer-usable program code is further configured to analyze the method in a linear manner.

13. The computer program product of claim 10, wherein the computer-usable program code is further configured to analyze the method in a non-linear manner.

14. The computer program product of claim 10, wherein the merge candidates are further defined to include classes satisfying at least one of the following: (1) the target of an invokevirtual bytecode; (2) the target of an invokespecial bytecode where the method is not <init>; (3) the non-primitive arguments to any invoke family bytecode; (4) the target of a getfield or putfield bytecode; (5) the non-primitive arguments to any putstatic or putfield bytecode; and (6) the non-primitive return type of a method.

15. The computer program product of claim 10, wherein the merge candidate list omits at least one of the following: (1) the java.lang.Object class; (2) any class identified as an interface; and (3) any class identified as "final."

16. The computer program product of claim 10, wherein the computer-usable program code is further configured to merge the types of objects to the java.lang.Object class in the event one type of object has already been loaded and the loaded type of object is not a merge candidate nor a subclass of any merge candidate.

17. The computer program product of claim 10, wherein the computer-usable program code is further configured to:
    load the unlisted type of object in the event neither of the types of objects have been loaded and only one type of object is listed in the merge candidate list; and
    load the listed type of object in the event the loaded unlisted type of object is a subclass of a merge candidate in the merge candidate list.

18. The computer program product of claim 10, wherein the computer-usable program code is further configured to:
    load one of the types of objects in the event neither type of object has been loaded and neither type of object is listed in the merge candidate list; and
    load the other type of object in the event the loaded type of object is a subclass of a merge candidate listed in the merge candidate list.

19. An apparatus for merging types of objects referenced in a method of an object-oriented program, the apparatus comprising:
    a verifier module implemented in at least one of hardware and software operating hardware, the verifier module configured to perform the following during bytecode verification:
    analyze a method within an object-oriented program to identify merge candidates, wherein merge candidates include classes that are used as input parameters to operations within the method;

record the merge candidates in a merge candidate list;

identify at least two code paths in the method that merge into a single code path, each code path operating on a different type of object;

in the event the merge candidate list is not empty, load at least one of the types of objects; and merge the types of objects to a nearest common superclass listed in the merge candidate list.

20. The apparatus of claim 19, wherein the verifier module is further configured to merge the types of objects to the java.lang.Object class in the event the merge candidate list is empty.

21. The apparatus of claim 19, wherein the verifier module is further configured to scan the method in a linear manner.

22. The apparatus of claim 19, wherein the verifier module is further configured to scan the method in a non-linear manner.

23. The apparatus of claim 19, wherein the merge candidates are further defined to include classes satisfying at least one of the following: (1) the target of an invokevirtual bytecode; (2) the target of an invokespecial bytecode where the method is not <init>; (3) the non-primitive arguments to any invoke family bytecode; (4) the target of a getfield or putfield bytecode; (5) the non-primitive arguments to any putstatic or putfield bytecode; and (6) the non-primitive return type of a method.

24. The apparatus of claim 19, wherein the merge candidates do not include at least one of the following: (1) the java.lang.Object class; (2) any class identified as an interface; and (3) any class identified as "final."

* * * * *